United States Patent
Kaga et al.

(10) Patent No.: US 10,704,977 B2
(45) Date of Patent: Jul. 7, 2020

(54) PRESSURE SENSOR

(71) Applicant: Hitachi Automotive Systems, Ltd., Hitachinaka-shi, Ibaraki (JP)

(72) Inventors: Yusuke Kaga, Tokyo (JP); Tomonari Misawa, Tokyo (JP); Kousaku Morita, Tokyo (JP); Hiroshi Onuki, Ibaraki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 65 days.

(21) Appl. No.: 16/304,026

(22) PCT Filed: Apr. 26, 2017

(86) PCT No.: PCT/JP2017/016607
§ 371 (c)(1),
(2) Date: Nov. 21, 2018

(87) PCT Pub. No.: WO2018/003267
PCT Pub. Date: Jan. 4, 2018

(65) Prior Publication Data
US 2019/0323915 A1 Oct. 24, 2019

(30) Foreign Application Priority Data

Jun. 27, 2016 (JP) .................... 2016-126179

(51) Int. Cl.
| G01L 23/32 | (2006.01) |
| G01L 9/00 | (2006.01) |
| G01L 19/00 | (2006.01) |
| G01L 19/04 | (2006.01) |
| G01L 19/14 | (2006.01) |
| G01M 15/05 | (2006.01) |

(52) U.S. Cl.
CPC ............ *G01L 23/32* (2013.01); *G01L 9/0092* (2013.01); *G01L 19/0061* (2013.01);
(Continued)

(58) Field of Classification Search
CPC ... G01L 23/32; G01L 9/0092; G01L 19/0061; G01L 19/04; G01L 19/147; G01L 23/28; G01L 19/06; G01M 15/05
See application file for complete search history.

(56) References Cited

U.S. PATENT DOCUMENTS

| 4,364,266 A | 12/1982 | Williams |
| 7,464,604 B2 * | 12/2008 | Takeuchi ............ G01L 19/0645 |
| | | 73/756 |

(Continued)

FOREIGN PATENT DOCUMENTS

| JP | 2-206738 A | 8/1990 |
| JP | 4-76961 A | 3/1992 |

(Continued)

OTHER PUBLICATIONS

Japanese-language Office Action issued in counterpart Japanese Application No. 2016-126179 dated May 7, 2019 with unverified translation (eight pages).

(Continued)

*Primary Examiner* — Freddie Kirkland, III
(74) *Attorney, Agent, or Firm* — Crowell & Moring LLP (57) ABSTRACT

A pressure sensor includes a connection portion provided with a screw portion configured to fix the pressure sensor to a combustion chamber of a vehicle engine; a hollow liquid-enclosing container fixed to one end of the connection portion; a pressure transmission fluid enclosed inside the liquid-enclosing container; a diaphragm fixed to one end of the liquid-enclosing container and elastically deformed when receiving pressure to transmit the pressure to the pressure transmission fluid; a pressure detection element fixed to the other end of the liquid-enclosing container and detecting the pressure transmitted to the pressure transmission fluid and converts the detected pressure into an electric signal; and a heat-dissipating rod provided inside the liquid- (Continued)

enclosing container. The connection portion and the liquid-enclosing container, and the connection portion and the diaphragm are mechanically connected to each other by welding or the like.

10 Claims, 9 Drawing Sheets

(52) U.S. Cl.
CPC ............ *G01L 19/04* (2013.01); *G01L 19/147* (2013.01); *G01M 15/05* (2013.01)

(56) References Cited

U.S. PATENT DOCUMENTS

| | | | |
|---|---|---|---|
| 9,841,338 B2* | 12/2017 | Hedtke | ............ G01L 9/0042 |
| 2008/0083283 A1 | 4/2008 | Takeuchi et al. | |
| 2016/0091383 A1 | 3/2016 | Hoffman et al. | |

FOREIGN PATENT DOCUMENTS

| | | |
|---|---|---|
| JP | 4-166735 A | 6/1992 |
| JP | 4-194638 A | 7/1992 |
| JP | 11-160176 A | 6/1999 |
| JP | 2008-89492 A | 4/2008 |
| JP | 2009-26495 A | 2/2009 |

OTHER PUBLICATIONS

International Search Report (PCT/ISA/210) issued in PCT Application No. PCT/JP2017/016607 dated Jun. 27, 2017 with English translation (five (5) pages).

Japanese-language Written Opinion (PCT/ISA/237) issued in PCT Application No. PCT/JP2017/016607 dated Jun. 27, 2017 (three (3) pages).

* cited by examiner

PRESSURE SENSOR

TECHNICAL FIELD

The present invention relates to a pressure sensor, and more particularly to a pressure sensor suitable for use under a high temperature environment.

BACKGROUND ART

As pressure sensors, those disclosed in PTL 1 (JP-2009-26495 A) and PTL 2 (JP H4-194638 A) are known.

PTL 1 discloses a pressure sensor including: a housing that is attachable to a member to be attached, which allows a medium to be detected to flow through an inside thereof, in which an introduction hole configured to introduce the medium to be detected is formed; a connector case that has a terminal configured to interchange a signal with an outside, the connector case having a smaller specific heat than the housing; a diaphragm that is displaced in accordance with a pressure to be detected of the medium to be detected which is introduced through the introduction hole; a sensor element that detects the pressure to be detected based on the displacement of the diaphragm; an enclosed space that is formed by assembling the housing and the connector case, the enclosed space having the sensor element arranged therein; and an insulating liquid with which an inside of the enclosed space is filled.

In addition, PTL 2 discloses a pressure sensor including: a diaphragm provided in a case; a pressure detection unit provided inside the case and directed to the diaphragm; and a pressure transmission fluid enclosed between the pressure detection unit and the diaphragm, in which a transmission fluid injection port configured to inject the pressure transmission fluid into the case is formed in the case, and a screw configured to seal the pressure transmission fluid is screwed to this transmission fluid injection port.

CITATION LIST

Patent Literature

PTL 1: JP 2009-26495 A
PTL 2: JP H4-194638 A

SUMMARY OF INVENTION

Technical Problem

The present inventor is developing a rod pressure sensor for a vehicle including a pressure detection IC obtained by combining a sensor element and a control circuit thereof into one chip.

In this pressure sensor, a pressure transmission medium is set to a liquid as a measure for suppressing deterioration of accuracy of internal pressure measurement caused by periodic vibration of a rod. However, when this pressure sensor is used in a high-temperature environment such as a combustion chamber of a vehicle engine, a temperature of the liquid as the pressure transmission medium exceeds a use upper limit temperature and the liquid is thermally decomposed, and thus, it is necessary to take measures to lower the temperature of the liquid below the use upper limit temperature.

The pressure sensor described in PTL 1 uses an insulating liquid as a cooling liquid, and cooling is performed targeting a sensor element portion, but does not have a structure for cooling the pressure transmission medium.

In addition, the pressure sensor described in PTL 2 includes a pressure transmission fluid as a pressure transmission medium, but does not have a mechanism for cooling the pressure transmission fluid.

Thus, when a liquid is used as the pressure transmission medium in these existing pressure sensors, internal pressure gradually increases along with gas generation caused by thermal decomposition of the liquid under a high temperature environment so that it is difficult to perform accurate pressure measurement.

Therefore, an object of the present invention is to provide a pressure sensor capable of accurately measuring pressure while suppressing thermal decomposition of a liquid even when the liquid is used as a pressure transmission medium under a high temperature environment.

Other objects and novel characteristics in addition to the above-described ones of the present invention will be apparent from description of the present specification and the attached drawings.

Solution to Problem

An overview of representatives among embodiments to be disclosed in the present application will be simply described as follows.

A pressure sensor according to one representative embodiment includes: a pressure transmission fluid that is enclosed inside a hollow liquid-enclosing container; a diaphragm that is elastically deformed when receiving pressure to transmit the pressure to the pressure transmission fluid; a pressure detection element that detects the pressure transmitted to the pressure transmission fluid and converts the detected pressure into an electric signal; and a heat dissipation member that is attached inside the liquid-enclosing container so as to be in contact with each of a part of an inner wall of the liquid-enclosing container and the pressure transmission fluid.

A pressure sensor according to one representative embodiment includes: a pressure transmission fluid that is enclosed inside a hollow liquid-enclosing container; a diaphragm that is elastically deformed when receiving pressure to transmit the pressure to the pressure transmission fluid; and a pressure detection element that detects the pressure transmitted to the pressure transmission fluid and converts the detected pressure into an electric signal. An inner wall of the liquid-enclosing container is formed as an uneven surface, the inner wall being in contact with the pressure transmission fluid, or the pressure sensor further includes a second heat-dissipating structural body that surrounds a part of the inner wall of the liquid-enclosing container and in contact with a part of the inner wall.

Advantageous Effects of Invention

According to the representative embodiments, it is possible to improve heat dissipation characteristics of the pressure sensor.

DESCRIPTION OF EMBODIMENTS

Hereinafter, embodiments of the present invention will be described in detail based on the drawings. Incidentally, the same reference numerals will be attached to members having the same function, in the entire drawing for describing the respective embodiments, and the repetitive description thereof will be omitted. In addition, the description of the same or similar portions will not be repeated in principle unless particularly required in the embodiments. Further, in the drawings for describing the embodiments, there is a case where hatching is omitted even in a cross-sectional view in order to facilitate understanding of the configuration.

First Embodiment

Figure 1:
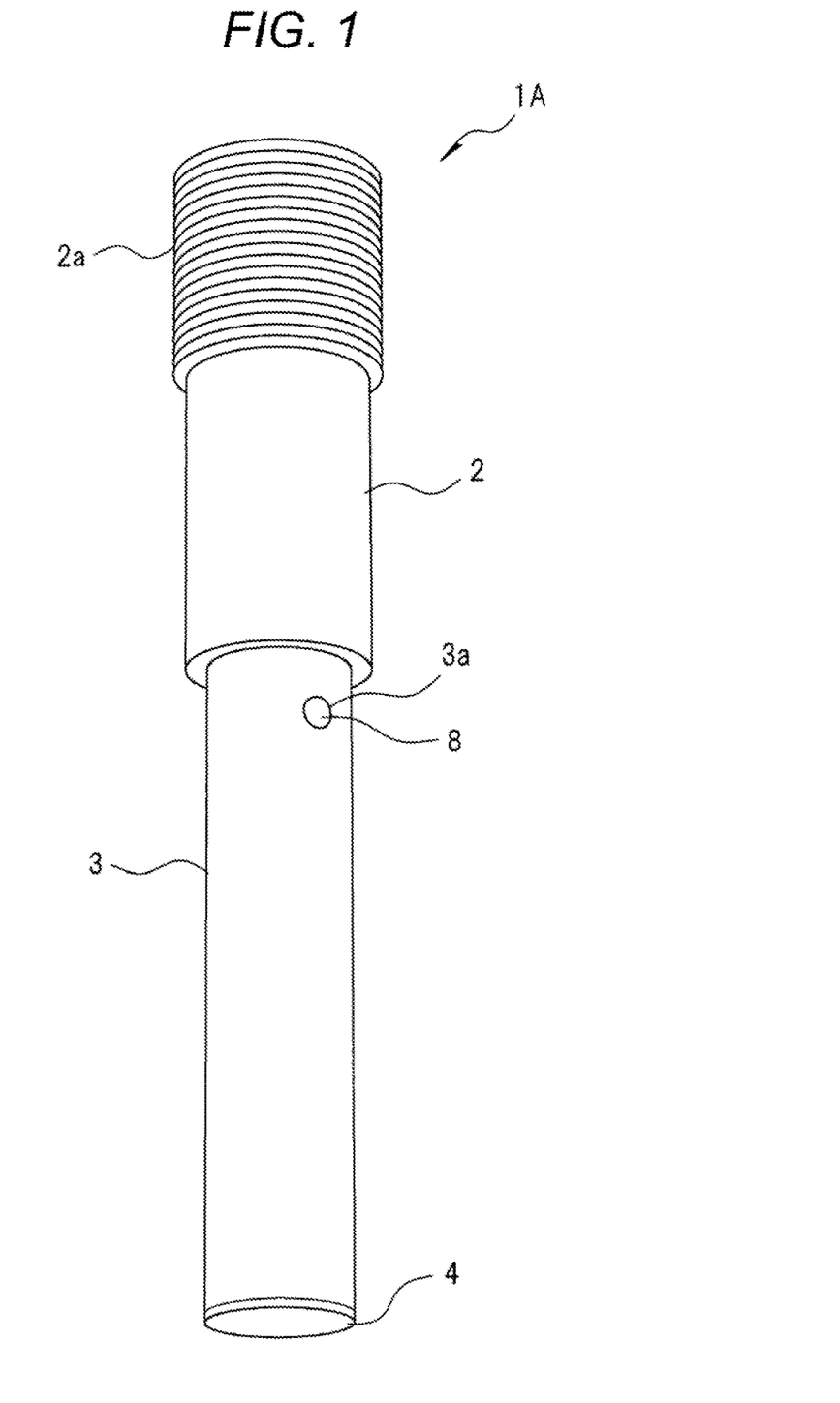
FIG. 1 is a perspective view of a pressure sensor of a first embodiment.
Figure 2:
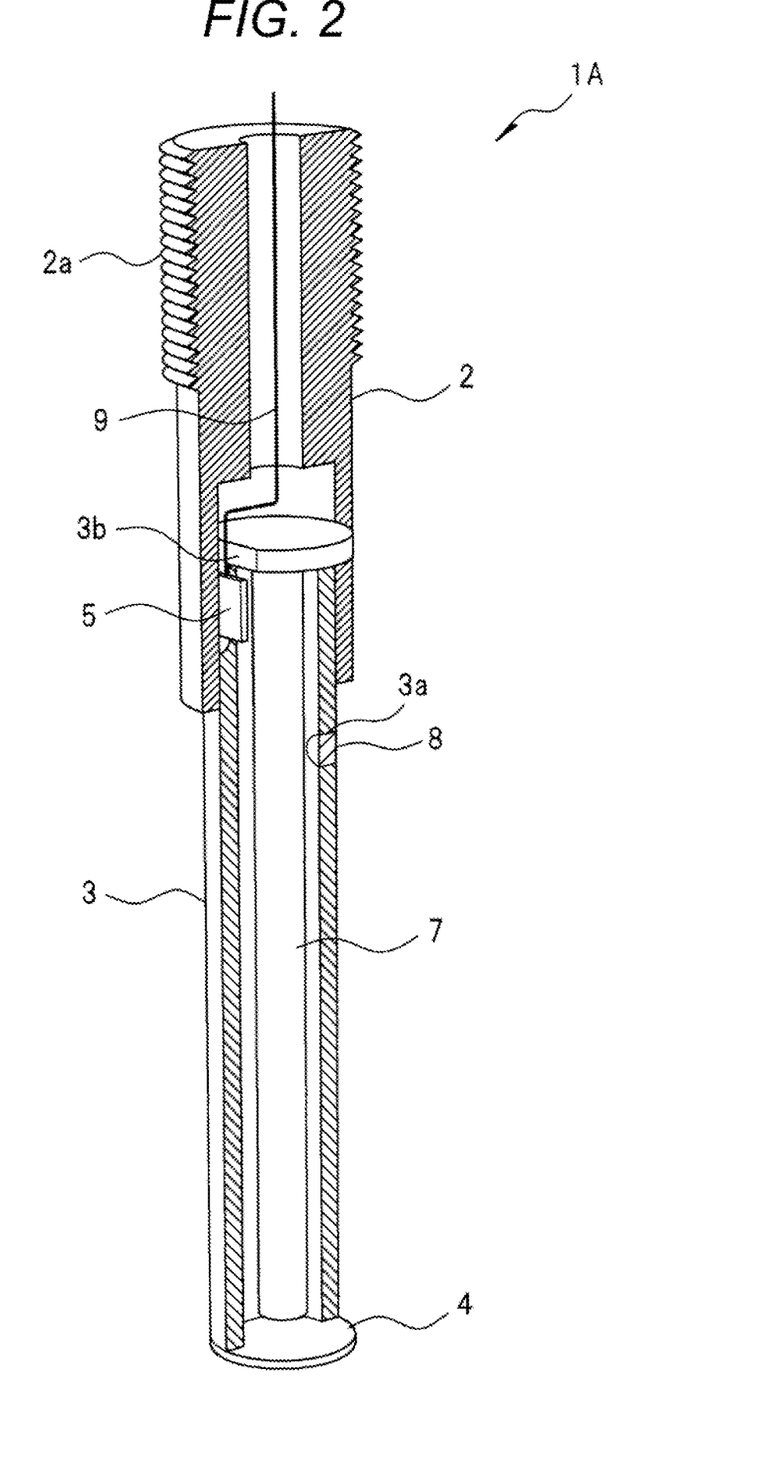
FIG. 2 is a partially-broken perspective view of the pressure sensor of the first embodiment.
Figure 3:
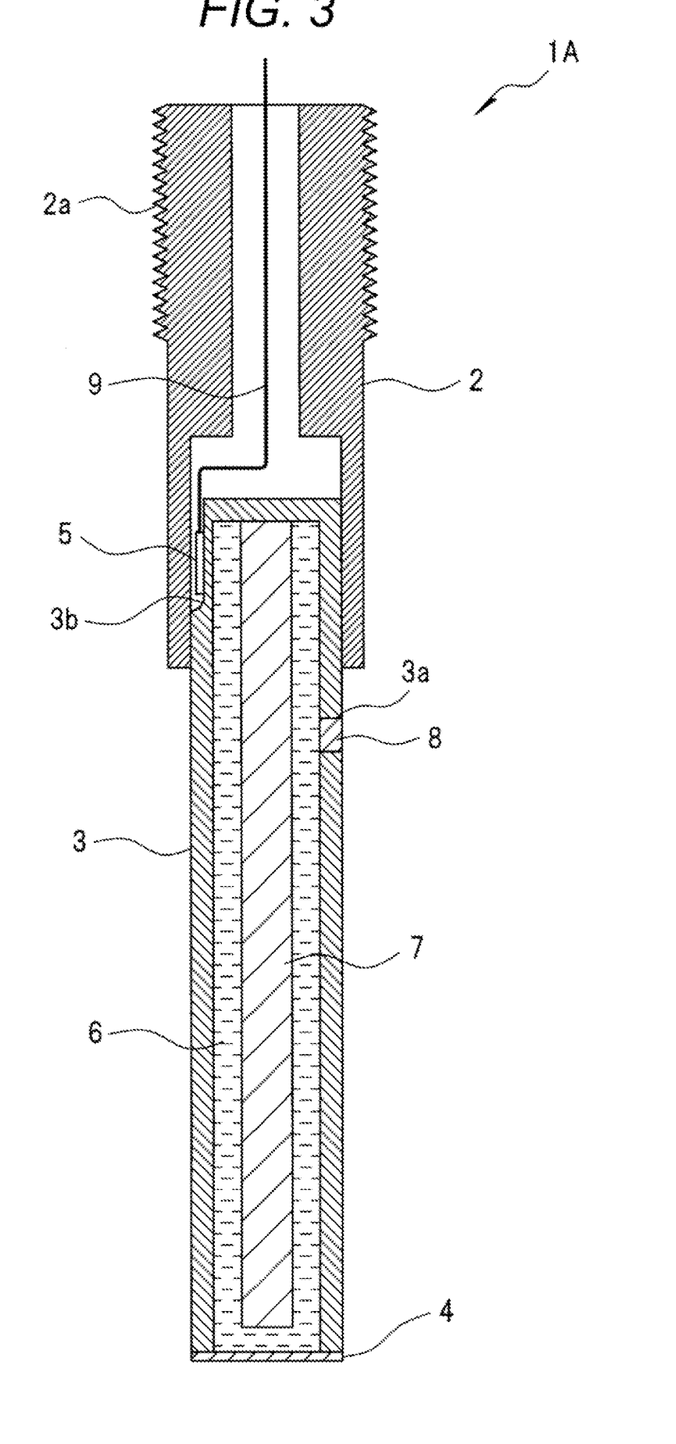
FIG. 3 is a cross-sectional view of the pressure sensor of the first embodiment.

FIG. 1 is a perspective view of a pressure sensor of the present embodiment, FIG. 2 is a partially-broken perspective view of the pressure sensor of the present embodiment, and FIG. 3 is a cross-sectional view of the pressure sensor of the present embodiment. Incidentally, FIGS. 1 to 3 illustrate the pressure sensor from a distal end (lower end) to a screw portion, and do not illustrate a portion above the screw portion.

A pressure sensor 1A of the present embodiment includes: a connection portion 2 provided with a screw portion 2a configured to fix the pressure sensor 1A to a combustion chamber of a vehicle engine; a hollow liquid-enclosing container 3 fixed to one end of the connection portion 2; a diaphragm 4 fixed to a distal end (lower end) of the liquid-enclosing container 3; a pressure detection element 5 fixed to the other end (upper end) of the liquid-enclosing container 3; a pressure transmission fluid 6 enclosed inside the liquid-enclosing container 3; and a heat-dissipating rod 7 provided inside the liquid-enclosing container 3. The connection portion 2 and the liquid-enclosing container 3, and the connection portion 2 and the diaphragm 4 are mechanically connected to each other by welding or the like.

The liquid-enclosing container 3 is preferably made of a material having high thermal conductivity such as metal, and for example, precipitation hardening stainless steel or inconel which has high hardness and excellent in high temperature characteristics such as heat resistance, corrosion resistance, oxidation resistance, and creep resistance is used. In the illustrated example, an external shape of the liquid-enclosing container 3 is a cylindrical shape, but may be an elliptical cylindrical shape, a rectangular cylindrical shape, or the like. In addition, a shape of the inner portion (hollow portion) of the liquid-enclosing container 3 is cylindrical, but may be elliptical or polygonal.

As the pressure transmission fluid 6 enclosed in the liquid-enclosing container 3, for example, fluorine oil, silicone oil, an ionic liquid, or the like is used. The pressure transmission fluid 6 is injected into the liquid-enclosing container 3 through an injection hole 3a provided on a side surface of the liquid-enclosing container 3, and then, the injection hole 3a is sealed with a sealing plug 8. As a method of injecting the pressure transmission fluid 6, for example, a vacuum injection method or the like is used. In addition, the sealing plug 8 is fixed to the injection hole 3a by, for example, screwing or welding.

The diaphragm 4 is formed with a thickness (for example, 0.2 to 0.5 mm) having mechanical strength at the extent not causing plastic deformation when receiving pressure from the outside. The diaphragm 4 is elastically deformed when receiving pressure and transmits the pressure to the pressure transmission fluid 6 in accordance with the deformation. The diaphragm 4 is preferably made of a metal material, for example, precipitation hardening stainless steel or inconel which has high hardness and excellent in high temperature characteristics such as heat resistance, corrosion resistance, oxidation resistance, and creep resistance is used.

A cutout portion 3b locally thinned and flattened by cutting, electric discharge processing, or the like is provided in a part of an outer surface of an upper end portion of the liquid-enclosing container 3, and the pressure detection element 5 is fixed to the cutout portion 3b.

The pressure received from the outside by the diaphragm 4 deforms a thin portion of the cutout portion 3b via the pressure transmission fluid 6. Then, the amount of deformation of the thin portion in accordance with the magnitude of the pressure is detected by the pressure detection element 5, and a signal thereof is output to the outside of the pressure sensor 1A through a wiring 9 connected to the pressure detection element 5. As the pressure detection element 5, an element capable of converting a structural change into an electric signal such as a piezoresistive sensor, and a strain gauge is used.

The heat-dissipating rod 7 is arranged inside the liquid-enclosing container 3 such that one end (upper end) is fixed to the upper end of the liquid-enclosing container 3 and the other end (lower end) is not in contact with the diaphragm 4. The heat-dissipating rod 7 may be integrally formed with the liquid-enclosing container 3 by, for example, metal injection molding, and may be mechanically connected to the liquid-enclosing container 3 by welding, press fitting, or the like.

The heat-dissipating rod 7 is preferably made of a material having high thermal conductivity such as metal or ceramics, and for example, precipitation hardening stainless steel or inconel, alumina, zirconia, aluminum nitride, silicon nitride, silicon carbide, or the like, which has high hardness and excellent in high temperature characteristics such as heat resistance, corrosion resistance, oxidation resistance, and creep resistance, is used. In the illustrated example, a shape of the heat-dissipating rod 7 is a circular rod, but may be an elliptic rod, a square rod, or the like, and may have a hollow structure such as a circular tube, an elliptic tube, and a square tube.

Figure 4:
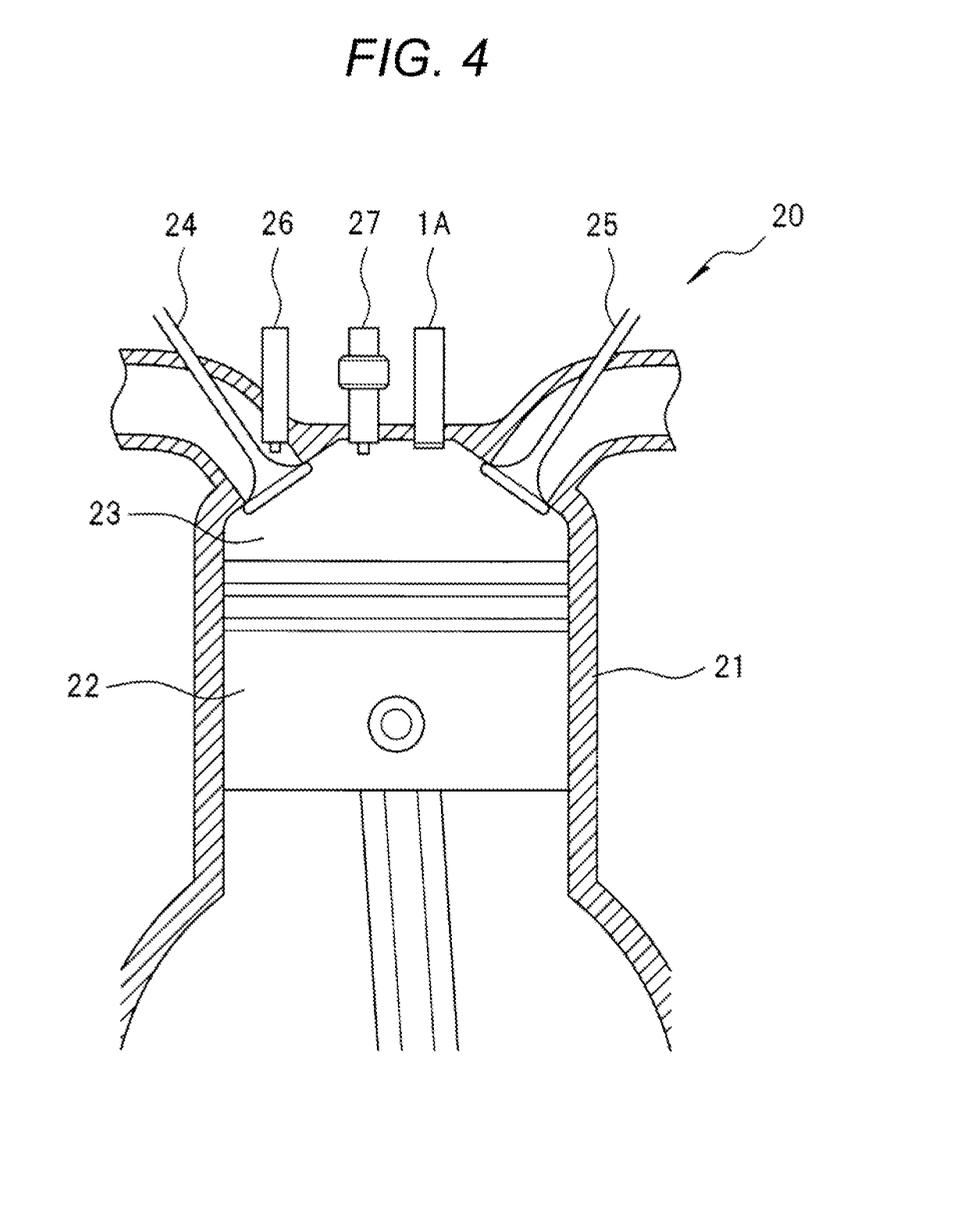
FIG. 4 is a schematic view of a vehicle gasoline engine to which the pressure sensor of the first embodiment is applied.

FIG. 4 is a schematic view of a vehicle gasoline engine illustrating an application example of the pressure sensor 1A of the present embodiment.

A vehicle gasoline engine 20 is provided with a combustion chamber 23 above a piston 22 reciprocating in a cylinder 21, and an intake valve 24, an exhaust valve 25, an injector (fuel injection device) 26, a spark plug 27, and the pressure sensor 1A are attached to an upper portion (cylinder head) of the combustion chamber 23.

The pressure sensor 1A is fixed to the cylinder head by the screw portion 2a of the connection portion 2 such that the diaphragm 4 is exposed inside the combustion chamber 23, and measures pressure in the combustion chamber 23 for each stroke of intake, compression, expansion, and exhaust to perform highly accurate control of combustion (improvement of fuel economy, reduction of exhaust gas amount, and the like).

According to the above-described pressure sensor 1A of the present embodiment, the heat-dissipating rod 7 in contact with the liquid-enclosing container 3 and the pressure transmission fluid 6 is provided inside the liquid-enclosing container 3, and thus, a heat dissipation path to transmit heat of the pressure transmission fluid 6 to the outside of the liquid-enclosing container 3 increases as compared with the case where the heat-dissipating rod 7 is not provided. That is, only an inner wall surface of the liquid-enclosing container 3 formed by a smooth surface without unevenness comes into contact with the pressure transmission fluid 6 in the case where the heat-dissipating rod 7 is not provided inside the liquid-enclosing container 3. However, when the heat-dissipating rod 7 is provided, the surface of the heat-dissipating rod 7 also contacts the pressure transmission fluid 6, and thus, a surface area in contact with the pressure transmission fluid 6 increases, and the heat dissipation performance of the pressure transmission fluid 6 improves.

As a result, it is possible to suppress an excessive temperature rise of the pressure transmission fluid 6, and thus, it is possible to suppress the gas generation caused by thermal decomposition of the pressure transmission fluid 6 and to perform highly accurate pressure measurement even under a high-temperature environment such as the combustion chamber of the vehicle engine.

Second Embodiment

Figure 5:
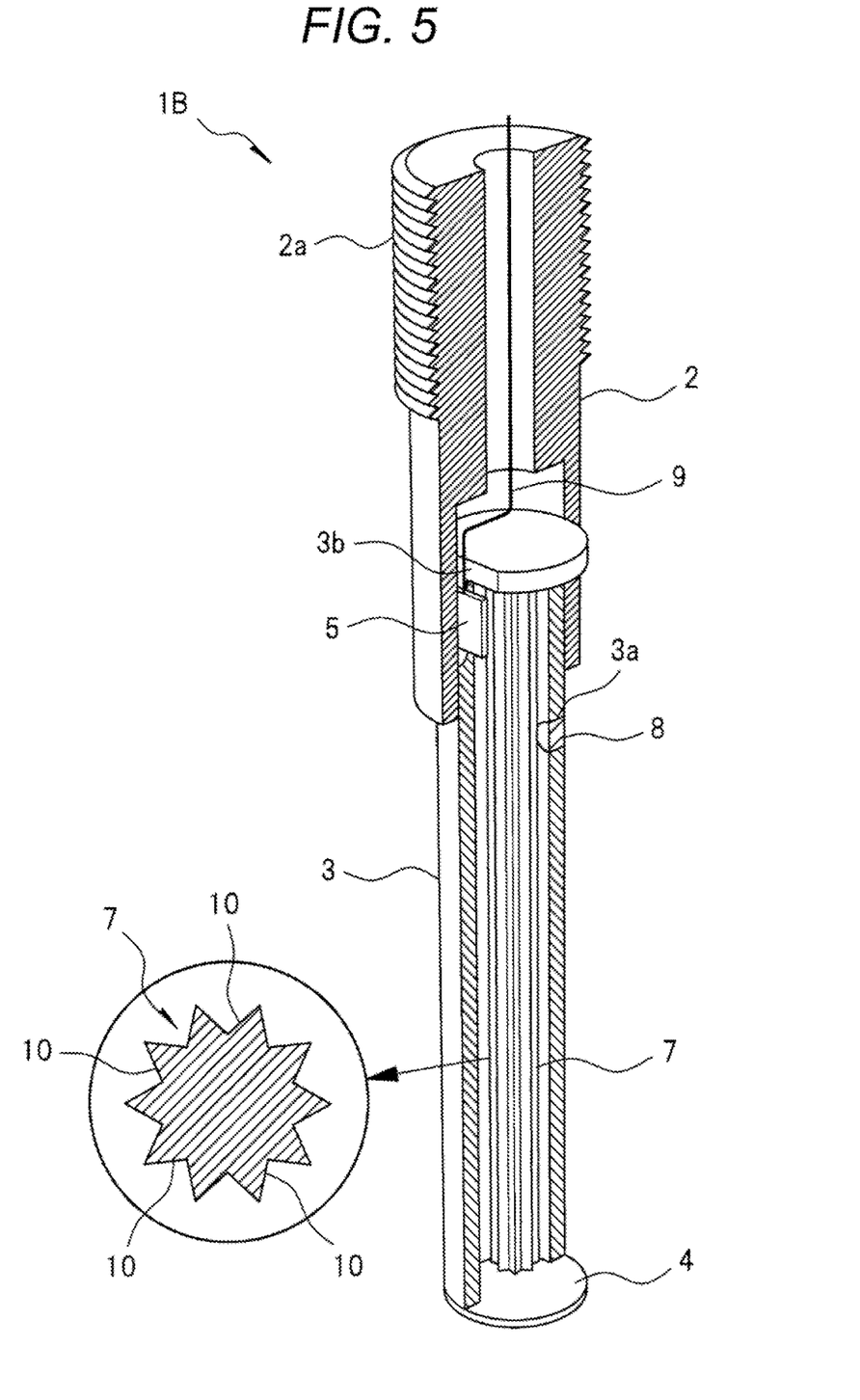
FIG. 5 is a partially-broken perspective view of a pressure sensor of a second embodiment.

FIG. 5 is a partially-broken perspective view of a pressure sensor of the present embodiment.

A feature of a pressure sensor 1B of the present embodiment in that a surface of the heat-dissipating rod 7 provided inside the liquid-enclosing container 3 is formed as an uneven surface. In the illustrated example, a plurality of elongated grooves 10 extending along an axial direction of the heat-dissipating rod 7 is formed on the surface of the heat-dissipating rod 7 so as to form the surface of the heat-dissipating rod 7 as the uneven surface. Other features of the pressure sensor 1B of the present embodiment are the same as those of the pressure sensor 1A of the first embodiment, and thus, the description thereof will be omitted.

The uneven surface of the heat-dissipating rod 7 can be formed by machining the surface of the heat-dissipating rod 7. In addition, the uneven surface may be formed by surface roughening treatment such as blast treatment, chemical liquid etching, redox treatment, plasma treatment, and sputtering treatment.

According to the pressure sensor 1B of the present embodiment, a surface area of the heat-dissipating rod 7 in contact with the pressure transmission fluid 6 increases as compared with the case where the surface of the heat-dissipating rod 7 is formed of the smooth surface without unevenness (the first embodiment), and thus, the heat dissipation performance of the pressure transmission fluid 6 is further improved and the excessive temperature rise of the pressure transmission fluid 6 can be further suppressed.

Figure 6:
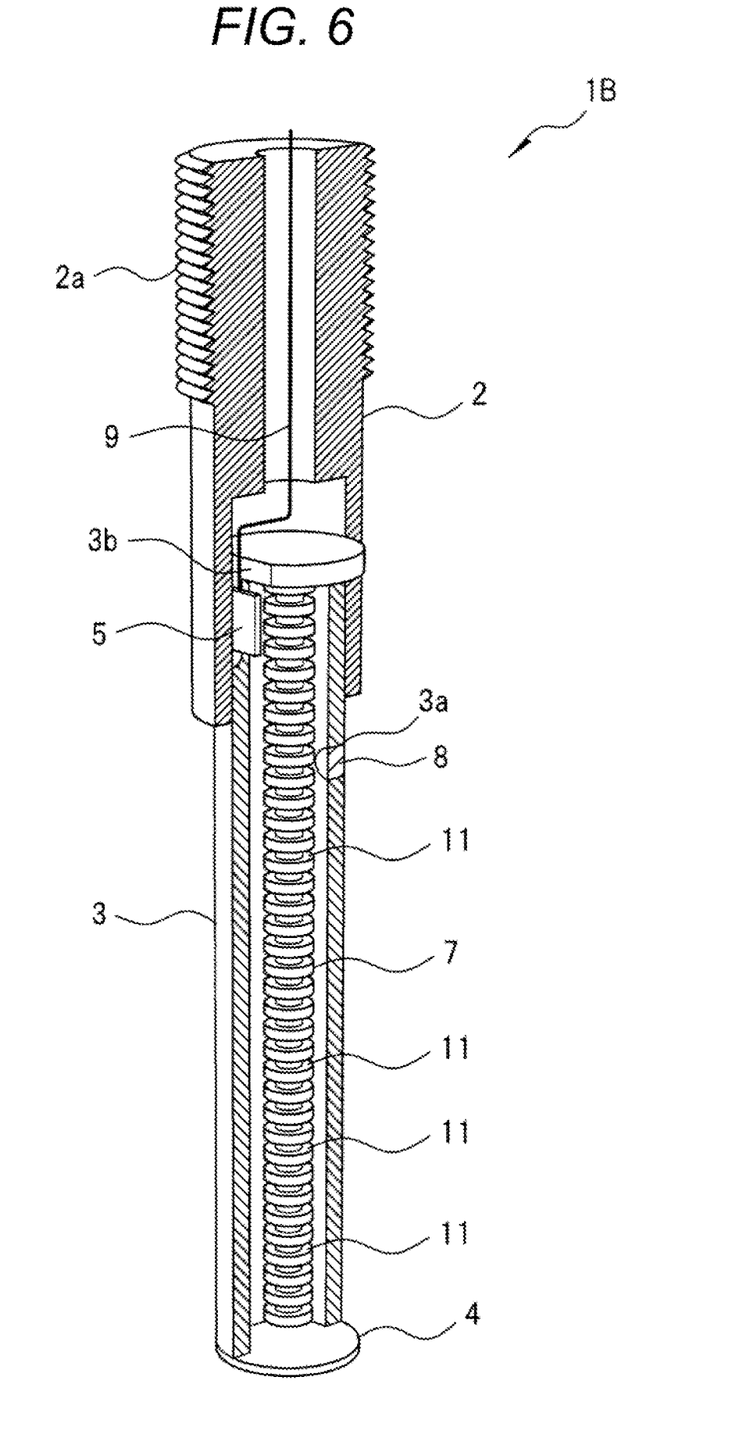
FIG. 6 is a partially-broken perspective view illustrating another example of the pressure sensor of the second embodiment.

In the example illustrated in FIG. 5, a plurality of elongated grooves 10 along the axial direction of the heat-dissipating rod 7 are formed on the surface of the heat-dissipating rod 7, a plurality of circumferential grooves 11 may be formed on the surface of the heat-dissipating rod 7 so as to form the surface of the heat-dissipating rod 7 as the uneven surface, for example, as illustrated in FIG. 6.

In addition, it is also possible to form the surface of the heat-dissipating rod 7 as the uneven surface by forming a groove having a spiral shape, a slit shape, or a lattice shape on the surface of the heat-dissipating rod 7 or by forming a plurality of protrusions on the surface of the heat-dissipating rod 7.

Third Embodiment

Figure 7:
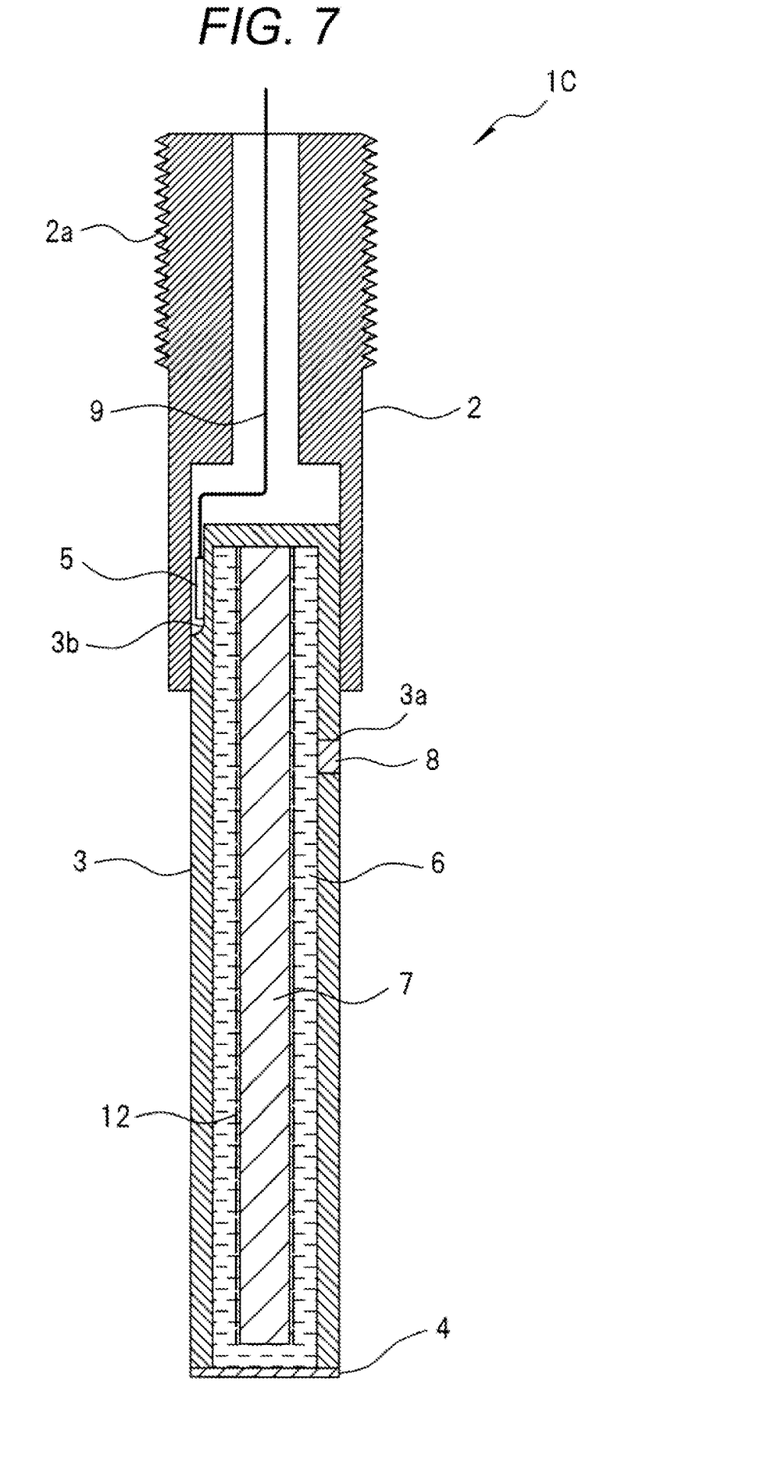
FIG. 7 is a cross-sectional view of a pressure sensor of a third embodiment.

FIG. 7 is a cross-sectional view of a pressure sensor of the present embodiment.

A feature of a pressure sensor 1C of the present embodiment is that a heat-dissipating structural body 12 consisting of a material having high thermal conductivity such as metal or ceramics is provided so as to surround the periphery of the heat-dissipating rod 7. The structural body 12 consists of, for example, a mesh-shaped or fibrous thin plate having a cylindrical shape, and is arranged inside the liquid-enclosing container 3 such that one end (upper end) thereof is fixed to the upper end of the liquid-enclosing container 3 and the other end (lower end) is not in contact with the diaphragm 4. Other features of the pressure sensor 1C of the present embodiment are the same as those of the pressure sensor 1A of the first embodiment, and thus, the description thereof will be omitted.

According to the pressure sensor 1C of the present embodiment, a surface area of the heat-dissipating rod 7 in contact with the pressure transmission fluid 6 increases as compared with the case where the surface of the heat-dissipating rod 7 is formed of the smooth surface without unevenness (the first embodiment), and thus, the heat dissipation performance of the pressure transmission fluid 6 is further improved and the excessive temperature rise of the pressure transmission fluid 6 can be further suppressed, which is similar to the second embodiment.

In addition, the surface of the heat-dissipating rod 7 is not processed as in the second embodiment in the case of the pressure sensor 1C of the present embodiment, and thus, it is possible to substantially increase a surface area of the heat-dissipating rod 7 without impairing strength of the heat-dissipating rod 7.

Further, the configuration of the pressure sensor 1C of the present embodiment and the configuration of the pressure sensor 1B of the second embodiment may be combined. That is, the structural body 12 of the present embodiment may be attached to the surface of the heat-dissipating rod 7 while forming the surface of the heat-dissipating rod 7 as the uneven surface. As a result, it is possible to further improve the heat dissipation performance of the pressure transmission fluid 6.

Fourth Embodiment

Figure 8:
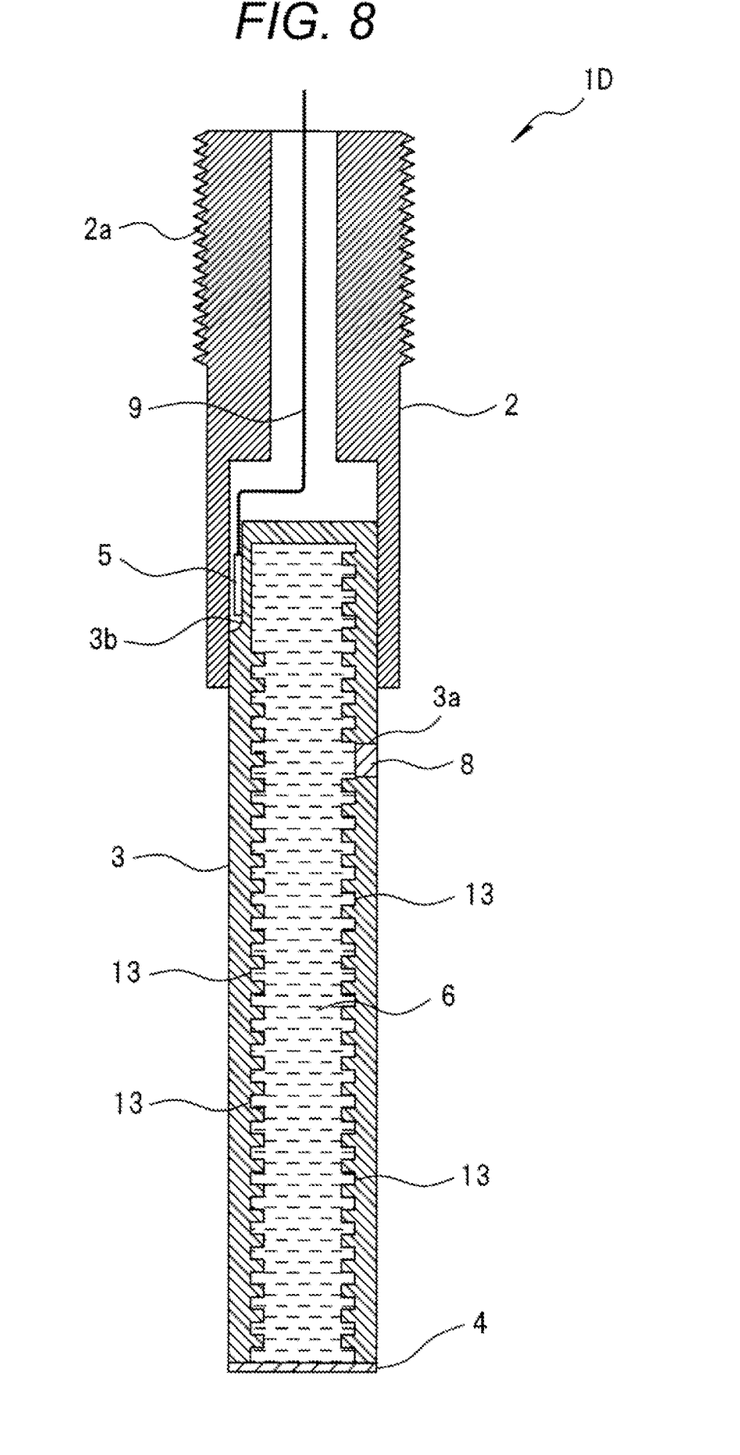
FIG. 8 is a cross-sectional view of a pressure sensor of a fourth embodiment.

FIG. 8 is a cross-sectional view of a pressure sensor of the present embodiment.

A feature of a pressure sensor 1D of the present embodiment is that a plurality of circumferential grooves 13 is formed on an inner wall surface of the liquid-enclosing container 3 to form the inner wall surface of the liquid-enclosing container 3 as an uneven surface, instead of the means for attaching the heat-dissipating rod 7 illustrated in the first to third embodiments to the inside of the liquid-enclosing container 3.

According to the pressure sensor 1D of the present embodiment, a surface area of the inner wall surface of the liquid-enclosing container 3 in contact with the pressure transmission fluid 6 increases as compared with the case where the inner wall surface of the liquid-enclosing container 3 is formed using the smooth surface without unevenness, and thus, the heat dissipation performance of the pressure transmission fluid 6 is further improved, and the excessive temperature rise of the pressure transmission fluid 6 can be further suppressed.

Although the inner wall surface of the liquid-enclosing container 3 is formed as the uneven surface by forming the plurality of circumferential grooves 13 on the inner wall surface of the liquid-enclosing container 3 in the example illustrated in FIG. 8, for example, the inner wall surface of the liquid-enclosing container 3 may be formed as the uneven surface by forming elongated grooves similar to the elongated grooves 10 illustrated in FIG. 5 of the second embodiment on the inner wall surface of the liquid-enclosing container 3. In addition, the inner wall surface of the liquid-enclosing container 3 may be formed as the uneven surface by surface roughening treatment such as blast treatment, chemical liquid etching, redox treatment, plasma treatment, and sputtering treatment.

Further, the heat-dissipating rod 7 illustrated in the first to third embodiments is not attached to the inside of the liquid-enclosing container 3 in the pressure sensor 1D of the present embodiment, and thus, it is possible to improve the heat dissipation performance of the pressure transmission fluid 6 without increasing the number of parts.

Fifth Embodiment

Figure 9:
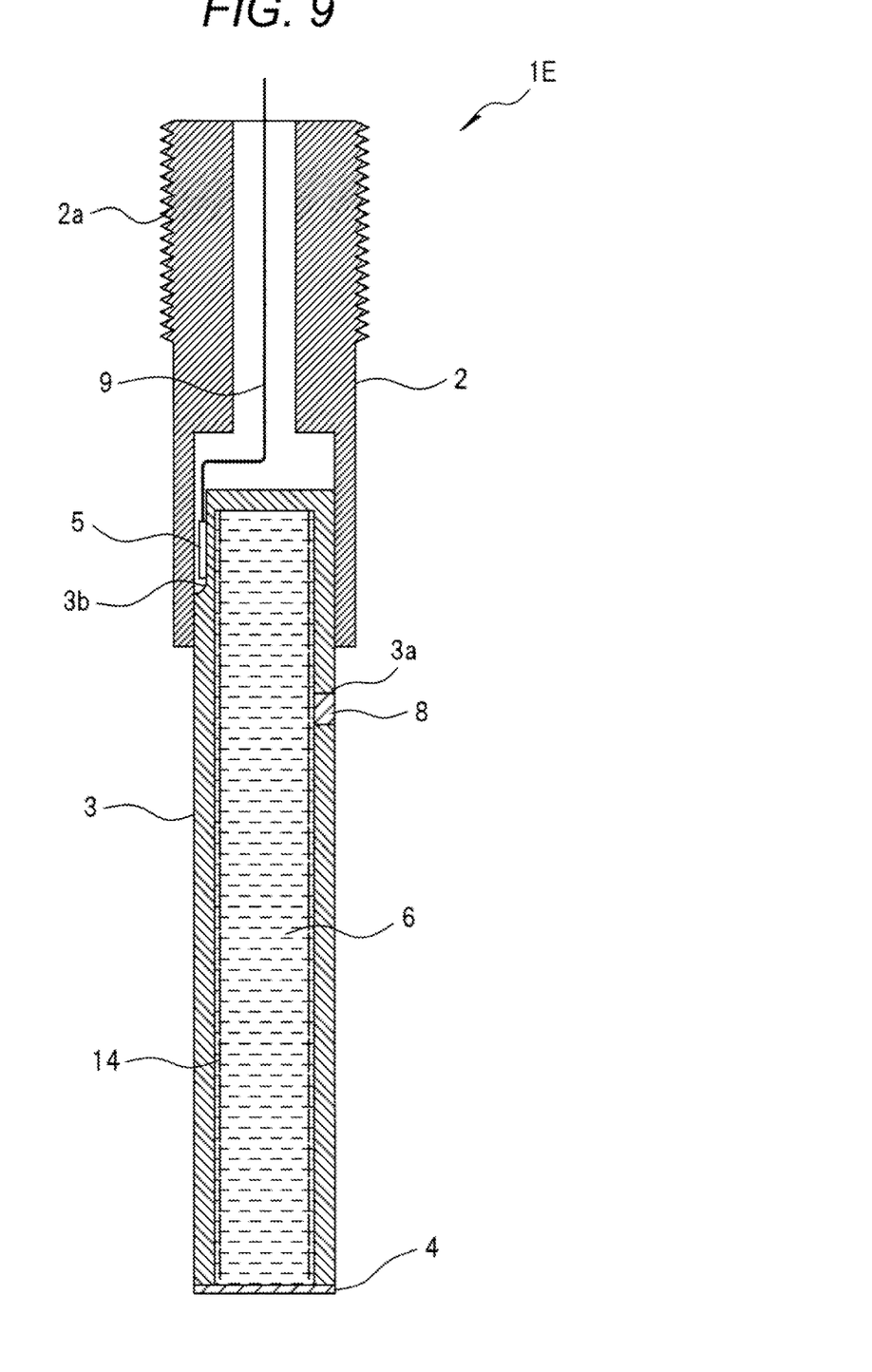
FIG. 9 is a cross-sectional view of a pressure sensor of a fifth embodiment.

FIG. 9 is a cross-sectional view of a pressure sensor of the present embodiment.

A feature of a pressure sensor 1E of the present embodiment is that a heat-dissipating structural body 14 consisting of a material having high thermal conductivity such as metal or ceramics is provided along an inner wall surface of the liquid-enclosing container 3, instead of the means for attaching the heat-dissipating rod 7 illustrated in the first to third embodiments to the inside of the liquid-enclosing container 3. The structural body 14 consists of, for example, a mesh-shaped or fibrous thin plate having a cylindrical shape, and is arranged inside the liquid-enclosing container 3 such that one end (upper end) thereof is fixed to the upper end of the liquid-enclosing container 3 and the other end (lower end) is not in contact with the diaphragm 4.

According to the pressure sensor 1E of the present embodiment, a surface area of the inner wall surface of the liquid-enclosing container 3 in contact with the pressure transmission fluid 6 increases as compared with the case where the inner wall surface of the liquid-enclosing container 3 is formed using the smooth surface without unevenness, and thus, the heat dissipation performance of the pressure transmission fluid 6 is further improved, and the excessive temperature rise of the pressure transmission fluid 6 can be further suppressed.

In addition, the inner wall surface of the liquid-enclosing container 3 is not processed as in the fourth embodiment in the case of the pressure sensor 1E of the present embodiment, and thus, it is possible to substantially increase a surface area of the liquid-enclosing container 3 without impairing strength of the liquid-enclosing container 3.

Further, the configuration of the pressure sensor 1E of the present embodiment and the configuration of the pressure sensor 1D of the fourth embodiment may be combined. That is, the structural body 14 of the present embodiment may be attached to the inner wall surface of the liquid-enclosing container 3 while forming the inner wall surface of the liquid-enclosing container 3 as the uneven surface. As a result, it is possible to further improve the heat dissipation performance of the pressure transmission fluid 6.

Although the description has been given in detail regarding the invention made by the present inventor based on the embodiments as above, the present invention is not limited to the embodiments, and can be modified in various ways within a scope not departing from a gist thereof.

For example, it is also possible to employ a configuration in which any one of the configurations of the first to third embodiments and the configurations of the fourth and fifth embodiments are appropriately combined.

REFERENCE SIGNS LIST 1A, 1B, 1C, 1D, 1E pressure sensor
2 connection portion
2a screw portion
3 liquid-enclosing container
3a injection hole
3b cutout portion
4 diaphragm
5 pressure detection element
6 pressure transmission fluid
7 heat-dissipating rod
8 sealing plug
9 wiring
10 long groove
11 circumferential groove
12 structural body
13 circumferential groove
14 structural body
20 vehicle gasoline engine
21 cylinder
22 piston
23 combustion chamber
24 intake valve
25 exhaust valve
26 injector
27 spark plug

The invention claimed is:
1. A pressure sensor comprising:
a hollow liquid-enclosing container;
a pressure transmission fluid that is enclosed inside the liquid-enclosing container;
a diaphragm that is attached to the liquid-enclosing container and is elastically deformed when receiving pressure to transmit the pressure to the pressure transmission fluid;
a pressure detection element that is attached to the liquid-enclosing container, and detects the pressure transmitted to the pressure transmission fluid and converts the detected pressure into an electric signal; and
a heat dissipation member that is attached inside the liquid-enclosing container so as to be in contact with each of a part of an inner wall of the liquid-enclosing container and the pressure transmission fluid.
2. The pressure sensor according to claim 1, wherein a surface of the heat dissipation member is formed as an uneven surface.

3. The pressure sensor according to claim 2, wherein
a plurality of grooves is provided on the surface of the heat dissipation member.

4. The pressure sensor according to claim 1, further comprising
a first heat-dissipating structural body that surrounds the heat dissipation member and is in contact with each of the part of the inner wall of the liquid-enclosing container and the pressure transmission fluid.

5. The pressure sensor according to claim 4, wherein
the first heat-dissipating structural body consists of a mesh-shaped or fibrous thin plate.

6. The pressure sensor according to claim 1, further comprising
a connection member that is connected to the liquid-enclosing container and has a screw portion configured to fix the liquid-enclosing container to a combustion chamber of an engine.

7. A pressure sensor comprising:
a hollow liquid-enclosing container;
a pressure transmission fluid that is enclosed inside the liquid-enclosing container;
a diaphragm that is attached to the liquid-enclosing container and is elastically deformed when receiving pressure to transmit the pressure to the pressure transmission fluid; and
a pressure detection element that is attached to the liquid-enclosing container, and detects the pressure transmitted to the pressure transmission fluid and converts the detected pressure into an electric signal,
wherein an inner wall of the liquid-enclosing container is formed as an uneven surface, the inner wall being in contact with the pressure transmission fluid, or
the pressure sensor further comprises a second heat-dissipating structural body that surrounds a part of the inner wall of the liquid-enclosing container and is in contact with a part of the inner wall.

8. The pressure sensor according to claim 7, wherein
a plurality of grooves is provided on the inner wall of the liquid-enclosing container.

9. The pressure sensor according to claim 7, wherein
the second heat-dissipating structural body consists of a mesh-shaped or fibrous thin plate.

10. The pressure sensor according to claim 7, further comprising
a connection member that is connected to the liquid-enclosing container and has a screw portion configured to fix the liquid-enclosing container to a combustion chamber of an engine.

* * * * *